US012756420B2

(12) United States Patent
Kaack et al.

(10) Patent No.: US 12,756,420 B2
(45) Date of Patent: Oct. 6, 2026

(54) SUBSCRIBER STATION FOR A SERIAL BUS SYSTEM, AND METHOD FOR COMMUNICATION WITH DIFFERENTIAL SIGNALS IN A SERIAL BUS SYSTEM

(71) Applicant: Robert Bosch GmbH, Stuttgart (DE)

(72) Inventors: Rolf Kaack, Reutlingen (DE); Steffen Walker, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 9 days.

(21) Appl. No.: 18/968,423

(22) Filed: Dec. 4, 2024

(65) Prior Publication Data

US 2025/0202522 A1 Jun. 19, 2025

(30) Foreign Application Priority Data

Dec. 13, 2023 (DE) .................... 10 2023 212 612.5

(51) Int. Cl.
*H04B 1/40* (2015.01)
*H04L 12/40* (2006.01)

(52) U.S. Cl.
CPC ............... *H04B 1/40* (2013.01); *H04L 12/40* (2013.01)

(58) Field of Classification Search
CPC ..... H04B 1/40; H04L 12/40; H04L 12/40013; H04L 2012/40215
See application file for complete search history.

(56) References Cited

U.S. PATENT DOCUMENTS

| | | | | |
|---|---|---|---|---|
| 6,462,989 | B1 * | 10/2002 | Huber | G11C 7/1057 365/185.23 |
| 2010/0237246 | A1 | 9/2010 | Koop et al. | |
| 2011/0054721 | A1 | 3/2011 | Goodrich et al. | |
| 2016/0196230 | A1 * | 7/2016 | Pihet | G06F 13/4027 710/314 |
| 2017/0329388 | A1 * | 11/2017 | Pihet | G06F 13/4022 |
| 2021/0119442 | A1 | 4/2021 | Pettersson et al. | |
| 2025/0132946 | A1 * | 4/2025 | Ross | H04L 12/40 |

OTHER PUBLICATIONS

ISO 11898-1:2015 Standard, "Road Vehicles—Controller Area Network (CAN)—Part 1: Data Link Layer and Physical Signalling," 2015, pp. 1-74.

* cited by examiner

*Primary Examiner* — David B Lugo
(74) *Attorney, Agent, or Firm* — Norton Rose Fulbright US LLP

(57) ABSTRACT

A subscriber station for a serial bus system and a method for transmitting a message with differential signals in a serial bus system. The subscriber station has a transmitting/receiving device for transmitting a digital transmit signal as an analog differential signal onto a bus of the bus system to transmit a message to at least one other subscriber station of the bus system, and/or for receiving an analog signal from the bus, a switching module for switching off a bus bias voltage for the bus during a predetermined detection period, a bus voltage detection module for detecting the bus voltage received by the transmitting/receiving device from the bus during the predetermined detection period, and a bus voltage setting module for setting the bus bias voltage to a voltage value resulting from a detection carried out by the bus voltage detection module during the predetermined detection period.

19 Claims, 6 Drawing Sheets

SUBSCRIBER STATION FOR A SERIAL BUS SYSTEM, AND METHOD FOR COMMUNICATION WITH DIFFERENTIAL SIGNALS IN A SERIAL BUS SYSTEM

CROSS REFERENCE

The present application claims the benefit under 35 U.S.C. § 119 of German Patent Application No. DE 10 2023 212612.5 filed on Dec. 13, 2023, which is expressly incorporated herein by reference in its entirety.

FIELD

The present invention relates to a subscriber station for a serial bus system and to a method for communication with differential signals in a serial bus system.

BACKGROUND INFORMATION

CAN bus systems are, for example, used for communication with differential signals in serial bus systems. Currently, Classical CAN and/or CAN FD, which are both standardized in the international standard ISO 11898-1:2015, are used for communication between devices in vehicles and/or in other technical devices. The devices form subscriber stations, which are also called nodes, on the bus. Each subscriber station has at least one transmitting/receiving device, also called a transceiver.

CAN FD is currently often used with a 2 Mbit/s data bit rate and a 500 kbit/s arbitration bit rate. So-called CAN SIC transmitting/receiving devices make the use of CAN FD with up to 8 Mbit/s possible. CAN XL is now available for higher data rates of currently up to 20 Mbit/s.

Currently, CAN bus systems use a voltage source of Vcc=5 V for the transmitting/receiving devices (transceivers) to generate the different voltage levels for differential signals on the bus. The signals serially signal the data to be exchanged.

For reducing costs, it is contemplated to use a voltage source of Vcc=3.3 V for the transmitting/receiving devices. Such a reduction in the supply voltage would be advantageous since the voltage of 3.3 V is used in many of today's microcontrollers. In addition, many other modules can also be supplied with this voltage.

The problem, however, is that there are already a large number of devices that can be used on the CAN bus and require a voltage supply of 5 V. Reducing the supply voltage from 5 V to 3.3 V therefore only offers the desired advantage if mixed operation on the bus is possible. In this case, any number of 5V subscriber stations (5V nodes) and any number of 3.3V subscriber stations (3.3V nodes) must be able to communicate simultaneously on a bus.

It must be taken into account that today's CAN bus has an average voltage of Vcc/2, i.e., 2.5 V, due to the differential signals CAN_H, CAN_L. This is achieved by each bus subscriber station attempting by means of a current source via a standardized resistor network to keep the bus more or less exactly at 2.5 V. The bus voltage substantially follows the node voltage (voltage at the subscriber station) that is the lowest, and is therefore typically slightly below 2.5 V.

When transmitting, a CAN subscriber station (node), more precisely its transmitting/receiving device, can switch between a dominant state and a recessive state. For the dominant state, it drives the CAN_H level to approximately 3.5 V (Vcc−diode voltage−losses) and the CAN_L level to approximately 1.5 V (diode voltage above GND). The difference between the CAN_H level and the CAN_L level is then in a range of 2 V. The international standard ISO11898-1:2015 requires a minimum of 1.5 V. The transition from the recessive to the dominant state or back takes place as symmetrically as possible around the virtual zero line, which is Vcc/2. This keeps the sum of the levels of CAN_H and CAN_L as close to 5 V as possible.

A major problem is that even small deviations in the mV range result in significant electromagnetic emissions, which cause EMC interference (EMC=electromagnetic compatibility) in other electrical devices. Therefore, there are specifications for maximum permissible electromagnetic emissions which must be met by each transmitting/receiving device (transceiver). However, these requirements for electromagnetic emissions represent a huge challenge.

The challenges are even greater in mixed operation if at least one subscriber station on the bus has a transmitting/receiving device (transceiver) that, in the dominant state, drives different voltage levels for CAN_H and CAN_L than the transmitting/receiving devices (transceivers) of other subscriber stations. The reasons for this are as follows.

A 3.3V CAN bus works the same as the 5V CAN bus, except that the voltages on the bus are different. A 3.3V node (subscriber station) can bring the CAN_H signal to approximately 3 V and the CAN_L signal to well below 1 V for the dominant state on the bus by eliminating the diode voltage of a diode of the transmitting/receiving device (transceiver) through circuit technology. As a result, the specified minimum level difference of 1.5 V can be exceeded even in a 3.3V CAN bus system.

A special feature of mixed operation is that a 5V node in the recessive phase sets the bus to 2.5 V, while a 3V node aims at approximately 1.65 V on the bus. By increasing the CAN_L voltage in a 3.3V CAN toward 1 V, the voltage in the recessive state can be increased to approximately 1.9 V. However, a difference of approximately 500-600 mV remains between the 5V and 3.3V nodes. In such a configuration, the bus takes on a voltage somewhere between 1.9 V and 2.5 V, and a current constantly flows toward the 3.3V node, but this current is in the range of a few microamperes.

If a subscriber station (node) starts to transmit and switches to the dominant state, the subscriber station (node) does not do so from "its" zero line but from that of the mixed operation. As a result, the sum of the levels of CAN_H and CAN_L changes when switching, and again when switching back.

This inevitably leads to high EMC emissions. Mixed operation is thus not so easily possible.

SUMMARY

It is an object of the present invention to provide a subscriber station for a serial bus system and a method for communication with differential signals in a serial bus system which solve the aforementioned problems. In particular, a subscriber station for a serial bus system and a method for communication with differential signals in a serial bus system are to be provided which enable reliable and preferably error-free and low-emission communication as easily and cost-effectively as possible on a bus to which subscriber stations of which the transmitting/receiving devices are designed to generate different voltage levels on the bus than the subscriber station are also connected.

The object is achieved by a subscriber station for a serial bus system having certain features of the present invention. According to an example embodiment of the present invention, the subscriber station has a transmitting/receiving device for transmitting a digital transmit signal as an analog differential signal onto a bus of the bus system in order to transmit a message to at least one other subscriber station of the bus system, and/or for receiving an analog signal from the bus, a switching module for switching off a bus bias voltage for the bus during a predetermined detection period, a bus voltage detection module for detecting the bus voltage received from the bus by the transmitting/receiving device during the predetermined detection period, and a bus voltage setting module for setting the bus bias voltage to a voltage value resulting from a detection carried out by the bus voltage detection module during the predetermined detection period.

The described subscriber station of the present invention thus solves the problem that, due to their design, conventional subscriber stations do not expect any external voltage levels on the bus. In contrast to conventional subscriber stations, the subscriber station described above is downward compatible and makes communication on the same bus with different voltage levels possible.

The described subscriber station (node) of the present invention ensures that, before transmitting a dominant state, the zero line is brought to the level required by the associated subscriber station. This level is approximately 1.9 V for a 3.3V subscriber station and approximately 2.5 V for a 5V subscriber station. Of course, this applies not only to the zero line before transmitting a dominant state but also between such states. The emissions that cause electromagnetic compatibility (EMC) problems can thereby be significantly reduced and, in the best case, minimized in the phase in which the subscriber station, more precisely its transmitting/receiving device, is transmitting.

The described embodiment of the subscriber station of the present invention is especially advantageous during the arbitration phase, in which the subscriber stations negotiate with one another as to which of the subscriber stations will have exclusive access to the bus in the following data phase and will thus be allowed to transmit its message. The reason for this is that there is a great deal of confusion during the arbitration phase anyway since all subscriber stations that are ready to transmit are in the dominant state. The described transmitting/receiving device ensures that it transitions the bus level to the desired level without too large a voltage jump, i.e., "smoothly," if it recognizes at the end of the arbitration phase that it is allowed to transmit. The same applies in the data phase after transmitting, when the described transmitting/receiving device switches back from the data phase to the arbitration phase.

In this way, the described subscriber station of the present invention makes mixed operation of subscriber stations with different voltages possible, in particular 3.3V subscriber stations and 5V subscriber stations. The subscriber station can thus offer cost savings for the bus system while still making low-emission and error-free operation of the bus system possible.

As a result, the described subscriber station of the present invention is extremely resource-efficient and cost-effective.

Overall, the described subscriber station of the present invention not only can realize communication in the described mixed operation in the bus system between other subscriber stations with the (high) bit rates required for the relevant communication standard but is also designed in such a way that the transmittable bit rate is not reduced by errors in the communication.

Advantageous further embodiments of the subscriber station of the present invention are disclosed herein.

According to an example embodiment of the present invention, the subscriber station may have a detection module control block for controlling the bus voltage detection module in such a way that a recessive state, which is overridable by a dominant state on the bus, prevails on the bus during the predetermined detection period.

The subscriber station may have a detection module control block for controlling the bus voltage detection module in such a way that a transition from a dominant state to a recessive state, which is overridable by a dominant state on the bus, takes place on the bus during the predetermined detection period, wherein the transition from the dominant state to a recessive state is in particular an SIC state.

The subscriber station may have a detection module control block for controlling the bus voltage detection module in such a way that, during the predetermined detection period, the end of the arbitration phase takes place and a dominant state prevails on the bus.

It is possible that the bus voltage detection module also comprises a switch and a storage element, wherein the detection module control block is designed to control the switch for connecting the storage element to the bus in order to detect the bus voltage received by the transmitting/receiving device from the bus.

The subscriber station of the present invention described above may also comprise a bus voltage provision module for providing two different bus bias voltages, wherein the bus voltage setting module is designed to set one of the two different bus bias voltages for the transmitting/receiving device on the basis of the bus voltage detected by the bus voltage detection module during the predetermined detection period.

Optionally, the bus voltage provision module comprises a voltage divider with six resistors for providing the two different bus bias voltages.

Optionally, the bus voltage provision module comprises a semiconductor with three bandgap derivatives for providing the two different bus bias voltages.

According to an example embodiment of the present invention, the bus voltage setting module may comprise a changeover switch and a setting module control block for controlling the position of the changeover switch on the basis of the bus voltage detected by the bus voltage detection module during the predetermined detection period.

The subscriber station described above may be designed to negotiate with the other subscriber stations of the bus system during a first communication phase as to which of the subscriber stations will have exclusive access to the bus in the following second communication phase and will thus be allowed to transmit its message.

The receiving/transmitting device can be designed to generate the analog differential signal with a different physical layer in a first communication phase of the message than in a second communication phase.

In one example embodiment of the present invention, the subscriber station described above also has an event detection module for detecting an event after which the bus voltage detection module has to carry out a detection of the bus voltage present on the bus, wherein the detection module control block is designed to control the bus voltage detection module for detecting the bus voltage present on the bus, during the predetermined detection period, after the event detection module has detected the event.

Here, the event may be a predetermined number of directly consecutive recessive bits at the end of a frame transmitted for the message via the bus.

The event may be that, at the end of the first communication phase, the subscriber station that will have exclusive access to the bus in the following second communication phase and will thus be allowed to transmit its message is ascertained.

The subscriber station of the present invention described above may also have a bus voltage holding module for holding the bus voltage detected on the bus by the bus voltage detection module, and optionally furthermore comprises a storage element, arranged between the bus voltage holding module and the bus voltage setting module, for storing a voltage at the output of the bus voltage detection module.

The subscriber station of the present invention described above may also have a bus voltage driver for driving the bus bias voltage set by the bus voltage setting module for the transmitting/receiving device onto the bus.

In one example embodiment of the present invention, the subscriber station described above also has a communication control device for controlling the communication in the bus system and for generating the transmit signal, wherein the subscriber station is designed for communication in a bus system in which exclusive, collision-free access of a subscriber station to the bus of the bus system is ensured at least temporarily.

At least one subscriber station described above may be part of a bus system that also has a bus and in which at least two subscriber stations are connected to one another via the bus in such a way that they can communicate serially with one another.

The aforementioned object is also achieved by a method for communication with differential signals in a serial bus system with certain features of the present invention. The method is performed with a subscriber station of the bus system that has a transmitting/receiving device for transmitting a digital transmit signal as an analog differential signal onto a bus of the bus system in order to transmit a message to at least one other subscriber station of the bus system, and/or for receiving an analog signal from the bus, wherein the method comprises the steps of switching off, by means of a switching module, a bus bias voltage for the bus during a predetermined detection period, detecting, by means of a bus voltage detection module, the bus voltage received from the bus by the transmitting/receiving device during the predetermined detection period, and setting, by means of a bus voltage setting module, the bus bias voltage to a voltage value resulting from a detection carried out by the bus voltage detection module during the predetermined detection period.

The method offers the same advantages as those mentioned above in relation to the subscriber station.

Further possible implementations of the present invention also include combinations, even those not explicitly mentioned, of features or embodiments described above or below with respect to the exemplary embodiments. In this case, a person skilled in the art will also add individual aspects as improvements or additions to the relevant basic form of the present invention.

BRIEF DESCRIPTION OF THE DRAWINGS

The present invention is described in more detail below with reference to the figures and on the basis of (an) exemplary embodiment(s).

In the figures, identical or functionally identical elements are given the same reference signs unless otherwise indicated.

DETAILED DESCRIPTION OF EXAMPLE EMBODIMENTS

Figure 1:
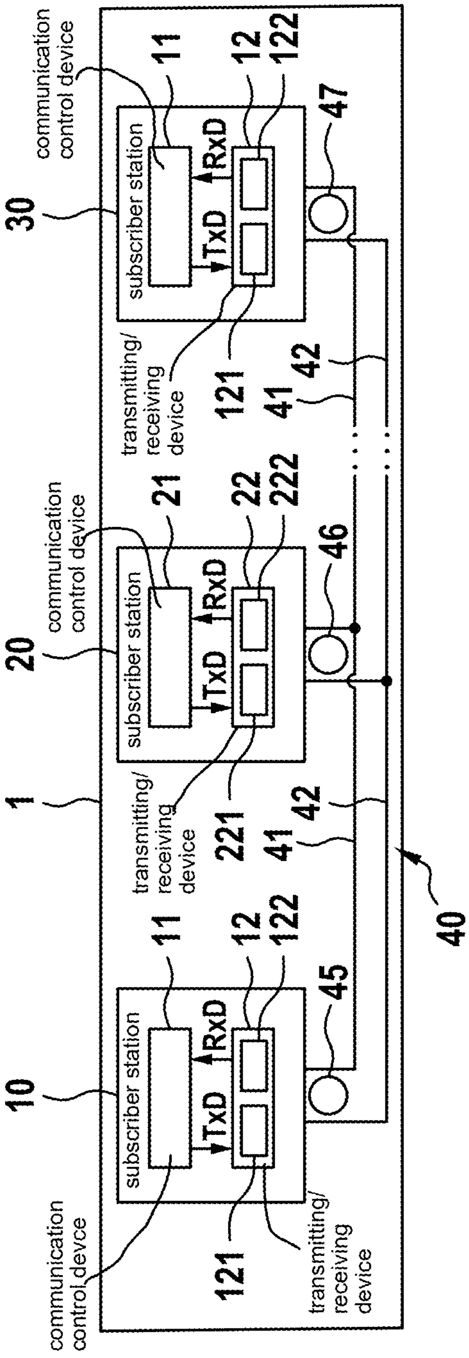
FIG. 1 shows a simplified block diagram of a bus system according to a first exemplary embodiment of the present invention.

FIG. 1 shows a bus system 1, which can, for example, at least in sections, be a CAN bus system, a CAN FD bus system, etc. The bus system 1 can be used in a vehicle, in particular a motor vehicle, an aircraft, etc., or in a hospital, etc.

Even though the bus system 1 is described below using CAN bus systems, the bus system 1 is not limited to CAN bus systems.

In FIG. 1, the bus system 1 has a plurality of subscriber stations 10, 20, 30, which are each connected to a bus 40 or bus line having a first bus wire 41 and a second bus wire 42. In a CAN bus system, the bus wires 41, 42 can also be called CANH and CANL for carrying signals CAN_H, CAN_L on the bus 40.

Messages 45, 46, 47 in the form of signals are transferred between the individual subscriber stations 10, 20, 30 via the bus 40. The subscriber stations 10, 20, 30 are, for example, control devices or display devices of a motor vehicle.

As shown in FIG. 1, the subscriber stations 10, 30 each have a communication control device 11 and a transmitting/receiving device 12. The transmitting/receiving device 12 has a transmitting module 121 and a receiving module 122. At least one of the subscriber stations 10, 20, 30 uses a supply voltage of 3.3 V, and at least one subscriber station 10, 20, 30 uses a supply voltage of 5 V. For illustration purposes, the following explanations show an example of a network or bus system 1 in which the subscriber station 20 has a supply voltage of 5 V and the subscriber stations 10 and 30 have a supply voltage of 3.3 V. Other constellations are also possible.

The subscriber station 20 has a communication control device 21 and a transmitting/receiving device 22. The transmitting/receiving device 22 has a transmitting module 221 and a receiving module 222.

The transmitting/receiving devices 12 of the subscriber stations 10, 30 and the transmitting/receiving device 22 of the subscriber station 20 are each directly connected to the bus 40, even though this is not shown in FIG. 1.

The communication control devices 11, 21 are each used for controlling communication of the corresponding subscriber station 10, 20, 30 via the bus 40 with at least one other subscriber station of the subscriber stations 10, 20, 30 which are connected to the bus 40.

Figure 6:
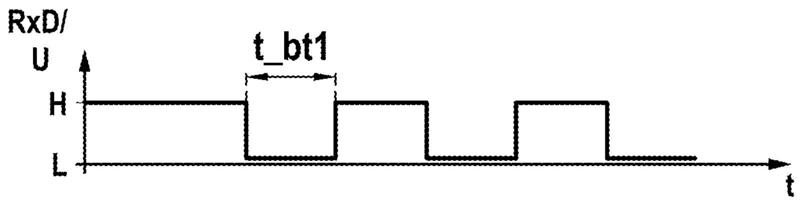
FIG. 6 shows a time profile of a digital receive signal which the first or second subscriber station generates from a signal received from the bus and which is based on the transmit signal of FIG. 3, according to an example embodiment of the present invention.

The communication control device 11 creates and reads first messages 45, 47, which are, for example, modified CAN messages 45, 47. Here, the modified CAN messages 45, 47 are in particular structured on the basis of the CAN XL format. The transmitting/receiving device 12 serves for transmitting and receiving the messages 45, 47 from the bus 40. The transmitting module 121 receives a digital transmit signal TxD created by the communication control device 11 for one of the messages 45, 47 and converts it into signals on the bus 40, as described in more detail with reference to FIG. 3, FIG. 4, and FIG. 7. The digital transmit signal TxD can be a pulse-width-modulated signal, at least temporarily or in sections. The receiving module 122 receives signals transmitted on the bus 40 corresponding to the messages 45 to 47 and generates a digital receive signal RxD therefrom, for which an example is shown in FIG. 6. The receiving module 122 transmits the receive signal RxD to the communication control device 11.

In addition, the communication control device 11 may optionally be designed to create and read second messages 46, which are, for example, CAN FD messages or CAN SIC messages 46. The transmitting/receiving device 12 can be designed accordingly.

The communication control device 21 can be designed as a conventional CAN controller according to ISO 11898-1:2015, i.e. as a CAN FD-tolerant Classical CAN controller or as a CAN FD controller. The communication control device 21 creates and reads second messages 46, for example CAN FD messages or CAN SiC messages. The transmitting/receiving device 22 is used to transmit and receive the messages 46 to/from the bus 40. The transmitting module 221 receives a digital transmit signal TxD created by the communication control device 21 and converts it into signals for a message 46 on the bus 40, as described in more detail with reference to FIG. 3 and FIG. 4. The receiving module 222 receives signals transmitted on the bus 40 corresponding to the messages 45 to 47 and generates a digital receive signal RxD therefrom, for which an example is shown in FIG. 6. The transmitting/receiving device 22 may be designed like a conventional CAN FD transceiver or CAN SiC transceiver.

For transmitting the messages 45, 46, 47 with CAN SIC or CAN XL, proven properties that are responsible for the robustness and user friendliness of CAN and CAN FD, in particular the frame structure with the identifier and the arbitration according to the conventional CSMA/CR method, are adopted, as described in more detail below.

With the two subscriber stations 10, 30, a formation and then a transmission of messages 45, 46, 47 with different CAN formats, in particular the CAN FD format or the CAN SIC format or the CAN XL format, as well as the reception of such messages 45, 46, 47 can be realized. This is described in more detail below for a message 45.

Figure 2:
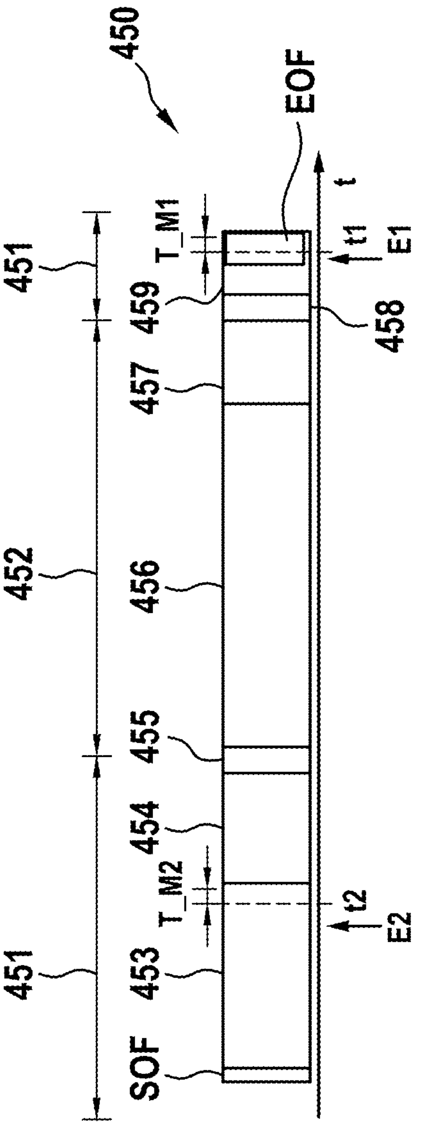
FIG. 2 shows a diagram for illustrating the structure of a message which can be transmitted by a first subscriber station of the bus system according to the first exemplary embodiment of the present invention.

FIG. 2 shows, for the message 45, a frame 450, which is in particular a CAN XL frame, said frame being provided by the communication control device 11 for the transmitting/receiving device 12 for transmission onto the bus 40. In this case, the communication control device 11 creates the frame 450 as compatible with CAN FD in the present exemplary embodiment. Alternatively, the frame 450 is compatible with any successor standard for CAN FD.

According to FIG. 2, the frame 450 is divided, for CAN communication on the bus 40, into different communication phases 451, 452, namely an arbitration phase 451 (first communication phase) and a data phase 452 (second communication phase). After a start bit SOF, the frame 450 has an arbitration field 453, a control field 454, a first switching field 455, a data field 456, a checksum field 457, a second switching field 458 and a frame termination field 459, in which a marking EOF (EOF=end of frame) is present. The checksum field 457, the second switching field 458 and the frame termination field 459 form a frame end phase 457, 458, 459 of the frame 450. In the frame termination field 459, there may be an acknowledgment field (ACK), which is not shown in the figures.

In contrast to the frame 450 of FIG. 2, no switching fields 455, 458 are present in a CAN FD frame, which the subscriber station 20 uses for the second message 46.

It is true for all aforementioned CAN versions that, in the arbitration phase 451, with the aid of an identifier (ID) in the arbitration field 453, negotiation takes place bitwise between the subscriber stations 10, 20, 30 as to which subscriber station 10, 20, 30 wishes to transmit the message 45, 46, 47 with the highest priority and is therefore granted exclusive access to the bus 40 of the bus system 1 for the near future for transmitting in the subsequent data phase 452. A physical layer such as in CAN and CAN FD is used in the arbitration phase 451. The physical layer corresponds to the bit transmission layer or layer 1 of the conventional OSI model (Open Systems Interconnection Model).

During the phase 451, the conventional CSMA/CR method is used, which allows simultaneous access of the subscriber stations 10, 20, 30 to the bus 40 without the higher priority message 45, 46, 47 being destroyed. As a result, further bus subscriber stations 10, 20, 30 can be added relatively easily to the bus system 1, which is very advantageous.

The CSMA/CR method has the consequence that there must be so-called recessive states on the bus 40, which can be overwritten by other subscriber stations 10, 20, 30 with dominant levels or dominant states on the bus 40. In the recessive state, high-impedance conditions prevail at the individual subscriber station 10, 20, 30, which in combination with the parasites on the bus circuit results in longer time constants. This leads to a limitation of the maximum bit rate of the present-day CAN-FD physical layer at currently about 2 megabits per second in real vehicle use.

At the end of the arbitration phase 451, switching to the data phase 452 takes place. In the case of CAN XL, switching takes place by means of the first switching field 455 of FIG. 2.

In the case of CAN XL, in the data phase 452, in addition to a portion of the first switching field 455, the payload data of the CAN XL frame 450 or of the message 45 from the data field 456 are transmitted, and so are the checksum field 457 and a portion of the second switching field 458. In the case of CAN FD, the payload data of the CAN FD frame or of the message 46 from the data field 456 are transmitted, and so is the checksum field 457.

At the end of the data phase 452, switching back to the arbitration phase 451 takes place. In the case of CAN XL, switching takes place by means of the second switching field 458 of FIG. 2.

A transmitter of the message 45 does not begin to transmit bits of the data phase 452 onto the bus 40 until the subscriber station 10 as the transmitter has won the arbitration and the subscriber station 10 as the transmitter thus has exclusive access to the bus 40 of the bus system 1 for transmitting.

A bit sequence is provided in the frame end field EOF, which bit sequence marks the end of the frame 450. The bit sequence of the end field (EOF) thus serves to mark the end of the frame 450. The end field (EOF) ensures that a number of 7 recessive bits is transmitted at the end of the frame 450. Together with an optional ACK delimiter in the acknowledgment field (not shown), a number of 8 recessive bits is transmitted at the end of the frame 450. The mentioned bit sequence of recessive bits are bit sequences that cannot occur within the frame 450. As a result, the end of the frame 450 can be reliably recognized by the subscriber stations 10, 30.

Starting from a point in time or a time t1, more precisely starting with the time t1, for a time period T_M1, the subscriber station 10 carries out a detection of the bus potential or the bus voltage present on the bus 40. The detection is carried out after an event E1 has occurred. The event E1 is that a predetermined number of directly consecutive recessive bits has occurred at the end of the frame 450, more precisely in the end field (EOF).

Optionally, the subscriber station may, starting from a time t2, more precisely starting with the time t2, for a time period T_M2, carry out a detection of the bus potential or the bus voltage present on the bus 40. The detection is carried out after an event E2 has occurred. The event E2 is that, at the end of the first communication phase, the subscriber station that will have exclusive access to the bus in the following second communication phase and will thus be allowed to transmit its message is ascertained.

This/these detection(s) or measurement(s) is/are described below with reference to the figures.

After the end field (EOF), which has 7 bits, an interframe space (IFS) (not shown in FIG. 2) follows in the frame 450. In CAN FD, this interframe space (IFS) is designed in accordance with ISO 11898-1:2015. The interframe space (IFS) has at least 3 bits.

Otherwise, the fields and bits mentioned are described in ISO 11898-1:2015 and for this reason are not described in more detail here.

Thus, in the arbitration phase 451 as the first communication phase, the subscriber stations 10, 30 use, in part, in particular up to the FDF bit (inclusive), a format from CAN/CAN FD, according to ISO 11898-1:2015. However, in comparison with CAN or CAN FD, an increase in the net data transfer rate, in particular to over 10 megabits per second, is possible in the data phase 452 as the second communication phase. In addition, an increase in the size of the payload data per frame, in particular to about 2 kilobytes or any other value, is possible.

Figure 3:
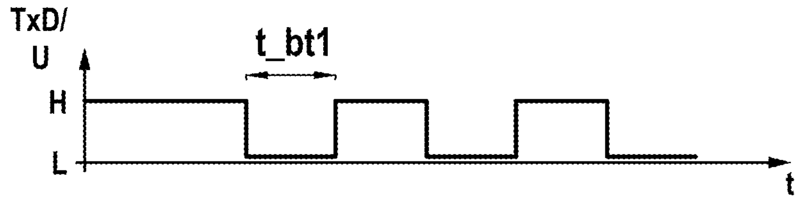
FIG. 3 shows a time profile of a digital transmit signal during operation of the bus system at the first and/or second subscriber station, which is connected with at least a first subscriber station to the same bus of the bus system.
Figure 4:
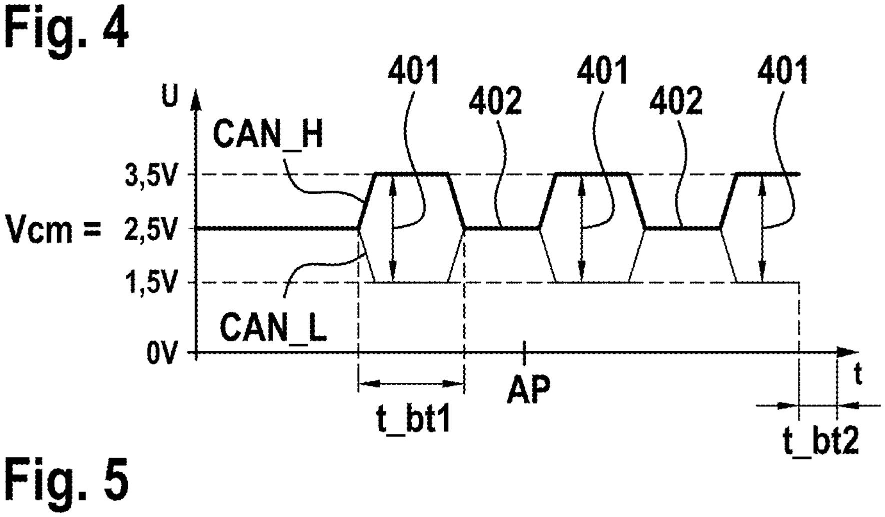
FIG. 4 shows a time profile of bus signals CAN_H and CAN_L at the second subscriber station according to the first exemplary embodiment of the present invention.
Figure 5:
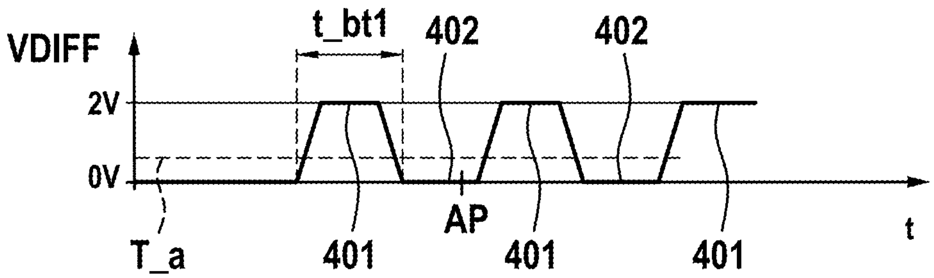
FIG. 5 shows a time profile of a differential voltage VDIFF of the bus signals CAN_H and CAN_L at the first and the second subscriber station according to the first exemplary embodiment of the present invention.
Figure 7:
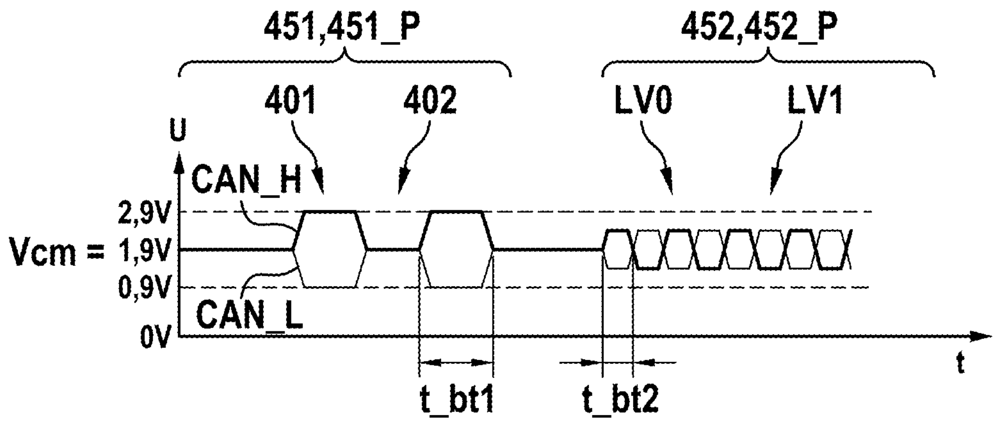
FIG. 7 shows a time profile of bus signals CAN_H and CAN_L, which can be generated on the bus by the first subscriber station according to the first exemplary embodiment of the present invention, starting from the transmit signal of FIG. 3.

FIG. 3, FIG. 5, and FIG. 6 illustrate, as an example, the signals that are generated at the subscriber stations 10, 20, 30 during operation of the bus system 1. FIG. 4 illustrates, as an example, the signals that are transmitted from the subscriber station 20 to the bus 40 during operation of the bus system 1. As already mentioned, the subscriber station 20 uses a supply voltage of 5 V. FIG. 7 shows the bus signals which each of the subscriber stations 10, 30 generates instead of the bus signals shown in FIG. 4. As already mentioned, the subscriber stations 10, 30 use a supply voltage of 3.3 V.

During operation of the bus system 1, each of the transmitting modules 121, 221 of FIG. 1 can serially convert a transmit signal TxD of the associated communication control device 11 into corresponding signals CAN_H, CAN_L for CAN or CAN FD for the bus wires 41, 42 and transmit these signals at the terminals for CAN_H and CAN_L onto the bus 40. The corresponding communication control device 11, 21 transmits the transmit signal TxD of FIG. 3 over time t (serially) to the associated transmitting module 121, 221, as shown in FIG. 1.

As shown as an example in FIG. 3, the transmit signal TxD has the voltage states H (high) and L (low) with a corresponding voltage U. The individual bits of the signal TxD have a bit time t_bt1, as shown in FIG. 3 for the arbitration phase 451. In the case of CAN FD and CAN XL, the bits of the TxD signal in the data phase 452 can be transmitted with a shorter bit time t_bt2, as illustrated in FIG. 4.

The sequence of the states H, L of the transmit signal TxD of FIG. 3 and the resulting states 401, 402 for the signals CAN_H, CAN_L in FIG. 4 as well as the resulting profile of the voltage VDIFF of FIG. 5 serve only to illustrate the function of the subscriber station 10. The sequence of the data states for the bus states 401, 402 can be selected as required.

According to the example of FIG. 4, the signals CAN_H and CAN_L have, at least in the arbitration phase 451, the dominant and recessive bus levels or bus states 401, 402, as from CAN. Since the subscriber station 20 uses a supply voltage of 5 V, it drives the CAN_H level to approximately 3.5 V and the CAN_L level to approximately 1.5 V for the dominant state 401, as shown in FIG. 4. The recessive state 402 occurs at 2.5 V, which is equal to the bus midpoint voltage Vcm=2.5 V.

As shown in FIG. 5 for the differential voltage VDIFF=CAN_H−CAN_L on the bus 40, the difference between the CAN_H level and the CAN_L level for the dominant state 401 is then in a range of 2 V.

The receiving modules 122, 222 form a receive signal RxD from signals CAN_H and CAN_L received from the bus 40, which are shown in FIG. 4, or from the differential voltage VDIFF of FIG. 5. For the generation of the digital receive signal RxD of FIG. 6, each receiving module 122, 222 samples the signal VDIFF received from the bus 40 or at least one of the signals CAN_H, CAN_L at sampling points AP according to FIG. 4 or FIG. 5, as is conventional. The receive signal RxD is shown in FIG. 6 without propagation delay. The receiving module 122 forwards this receive signal RxD to the associated communication control device 11, 21, as shown in FIG. 1.

In contrast to FIG. 4, FIG. 7 shows the signals CAN_H and CAN_L, which the subscriber stations 10, 30 generate on the bus 40 in the arbitration phase 451 and the data phase 452. At least in the arbitration phase 451, the dominant and recessive bus levels or bus states 401, 402 are used, as already shown in FIG. 4. Since the subscriber stations 10, 30 use a supply voltage of 3.3 V, they drive the CAN_H level to approximately 2.9 V and the CAN_L level to approximately 0.9 V for the dominant state 401, as shown in FIG. 7. The recessive state 402 occurs at 1.9 V, which is equal to the bus midpoint voltage Vcm=1.9 V. In the data phase 452, CAN XL can use a different physical layer 452_P than the physical layer 451_P in the arbitration phase 451.

Consequently, the CAN_H levels can be driven to values for the states LV1, LV0, as shown in FIG. 7. A physical layer such as in CAN and CAN FD is used in the arbitration phase 451. The physical layer corresponds to the bit transmission layer or layer 1 of the conventional OSI model (Open Systems Interconnection Model).

For the transmit signal TxD of FIG. 3, the transmitting module 121 generates the signals CAN_H, CAN_L in FIG. 7 for the bus wires 41, 42 in such a way that the state LV0 is formed for a state LW (low). In addition, the state LV1 is formed for a state HI (high).

In order to increase the data rate for CAN XL, the transmitting/receiving devices 12 can be designed for CAN SIC.

Figure 8:
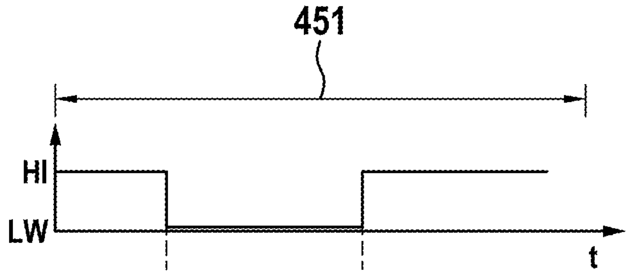
FIG. 8 shows an example of a time profile of a digital transmit signal which is to be converted in an arbitration phase (SIC operating mode of a transmitting module) into bus signals CAN_H, CAN_L for a bus of the bus system of FIG. 1.
Figure 9:
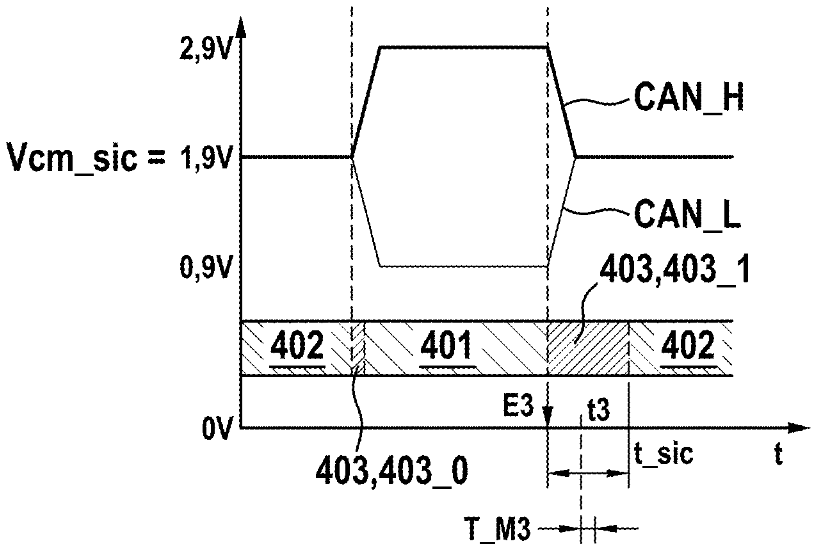
FIG. 9 shows the time profile of the bus signals CAN_H, CAN_L during switching from a recessive bus state to a dominant bus state and back to the recessive bus state, which bus signals are transmitted onto the bus in the arbitration phase (SIC operating mode) due to the transmit signal of FIG. 8/

As shown in more detail in FIG. 8 and FIG. 9, for the transmit signal TxD of FIG. 8, the transmitting module 121 in CAN SIC generates the signals CAN_H, CAN_L according to FIG. 9 for the bus wires 41, 42 at a bus midpoint voltage Vcm_sic=1.9 V and in such a way that a state 403 (sic) is additionally present. The state 403 (SIC) can have different lengths, as shown with the state 403_0 (sic) during the transition from the state 402 (rec) to the state 401 (dom) and with the state 403_1 (sic) during the transition from the state 401 (dom) to the state 402 (rec). The state 403_0 (sic) is shorter in time than the state 403_1 (sic). In order to generate signals according to FIG. 9, the transmitting module 121 is switched to a SIC operating mode (SIC mode).

Passing through the short sic state 403_0 is not required in CiA610-3
and the state depends on the type of implementation. The duration of the "long" state 403_1 (sic) is specified for CAN SIC as well as for the SIC operating mode in CAN XL as t_sic<530 ns, starting with the rising edge of the transmit signal TxD of FIG. 5.

Starting from a point in time or a time t3, more precisely starting with the time t3, after an event E3 has occurred, for a time period T_M3, the subscriber station 10 carries out a detection of the bus potential or the bus voltage present on the bus 40. The event E3 is that the state 401 (dom) is left or switching takes place from the state 401 (dom) to the state 403 (sic).

In the "long" state 403_1 (sic), the transmitting module 121 should adapt the impedance between the bus wires 41 (CANH) and 42 (CANL) as well as possible to
the characteristic impedance Zw of the bus line used. Here, Zw equals 100 ohms or 120 ohms. This adaptation prevents reflections and thus allows operation at higher bit rates. For the sake of simplicity, hereinafter reference will always be made to the state 403 (sic) or sic state 403.

Figure 10:
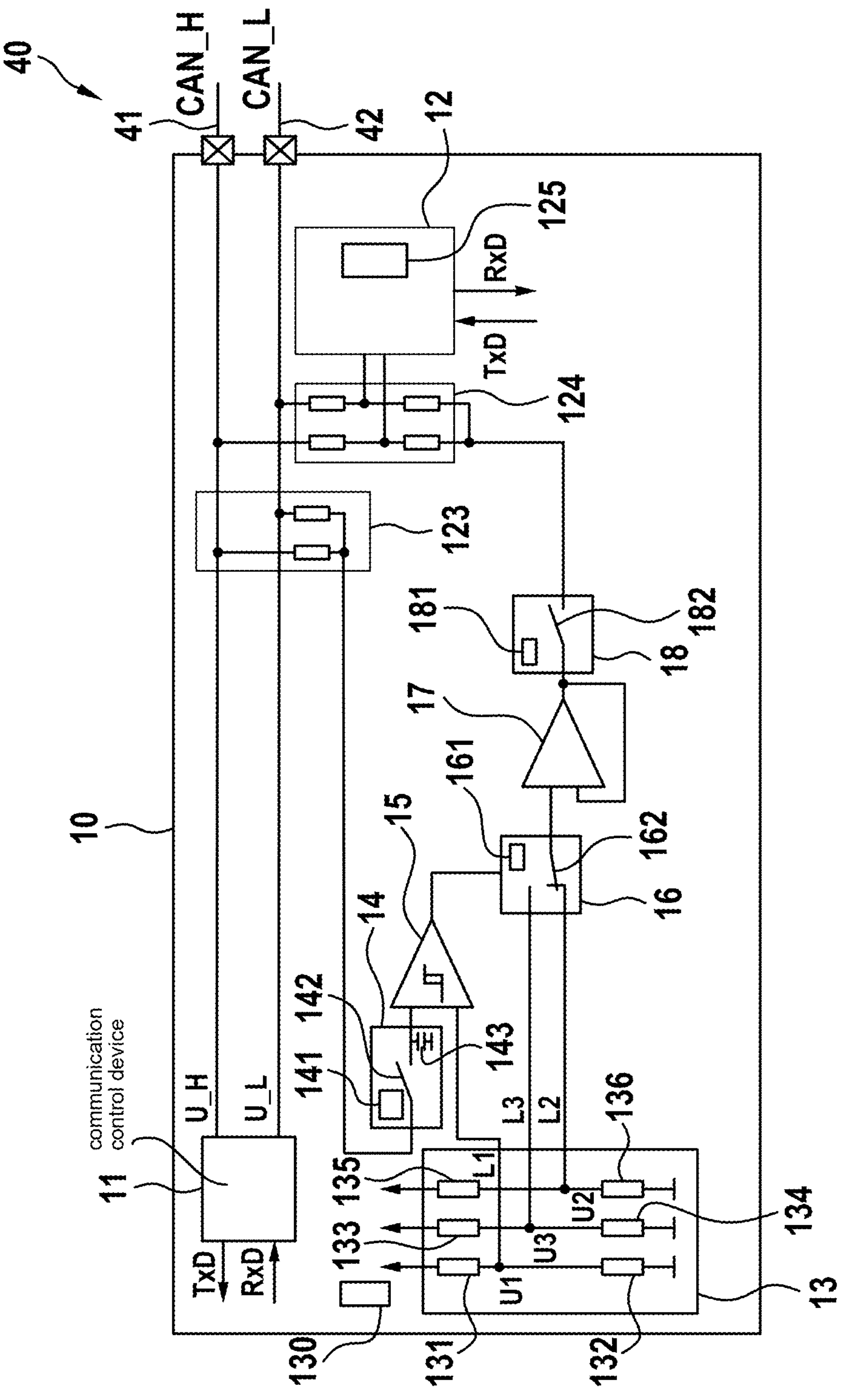
FIG. 10 shows a circuit diagram of a subscriber station of the bus system according to the first exemplary embodiment of the present invention.

FIG. 10 shows the subscriber station 10 in more detail, which comprises the communication control device 11 and the transmitting/receiving device 12, as described above with reference to FIG. 1. During transmission operation of the subscriber station 10, the transmitting/receiving device 12 outputs differential voltages U_H=2.9 V and U_L=0.9 V for the signals CAN_H, CAN_L at its output, as described above with reference to FIG. 7. The transmitting/receiving device 12 may comprise an event detection module 125 for detecting one of the events E1, E2, E3 shown in FIG. 2 and FIG. 9. The event detection module 125 may in particular have a counter for evaluating the receive signal RxD and/or a timer for detecting whether a predetermined time has elapsed. The subscriber station 30 may be designed in the same way as the subscriber station 10. For this reason, the subscriber station 30 is not described separately here.

According to FIG. 10, the subscriber station 10 has an electrical circuit with a bus voltage provision module 13, a bus voltage detection module 14, a bus voltage holding module 15, a bus voltage setting module 16, a bus voltage driver 17, and a bus bias voltage module 18. In addition, the subscriber station 10 has a first connection network 123, a second connection network 124, and an electrical voltage supply 130. The first connection network 123, which may comprise at least two resistors (not denoted in more detail in FIG. 10), serves to connect the detection module 14 to the terminals for the signals CAN_H, CAN_L. The second connection network 124, which may comprise at least four resistors (not denoted in more detail in FIG. 10), serves to connect the transmitting/receiving device 12 to the terminals for the signals CAN_H, CAN_L. The voltage supply 130 supplies the subscriber station 10 with an electrical voltage of 3.3 V.

The bus voltage provision module 13 is connected on one side to the electrical voltage supply 130. On the other side, the bus voltage provision module 13 is connected to ground, in particular CAN-GND. In the present exemplary embodiment, the bus voltage provision module 13 is designed as a voltage divider with six resistors 131 to 136. The resistors 131 to 136 form reference voltage sources as follows. A first resistor 131 is connected in series with a second resistor 132. The second resistor 132 is connected to ground, in particular CAN-GND. During operation of the subscriber station 10, a voltage or potential of U1=2.1 V is established between the resistors 131, 132. A third resistor 133 is connected in series with a fourth resistor 134. The fourth resistor 134 is connected to ground, in particular CAN-GND. During operation of the subscriber station 10, a voltage or potential of U3=2.5 V is established between the resistors 133, 134. A fifth resistor 135 is connected in series with a sixth resistor 136. The sixth resistor 136 is connected to ground, in particular CAN-GND. During operation of the subscriber station 10, a voltage or potential of U2=1.9 V is established between the resistors 135, 136.

The resistors 131 to 136 thus provide reference voltages U1, U2, U3 for the subscriber station 10. The voltages U2, U3 can be used as different bus bias voltages for the bus 40. If necessary, the module 130 is designed to provide more than two different bus bias voltages for the bus 40, in particular by using more than six resistors 131 to 136.

A first electrical line L1 is connected at a first end to a connection of the resistors 131, 132 and at its other end to the bus voltage holding module 15. A second electrical line L2 is connected to a connection of the resistors 135, 136 and at its other end to the bus voltage setting module 16. A third electrical line L3 is connected to a connection of the resistors 133, 134 and at its other end to the bus voltage setting module 16.

At least one input of the bus voltage detection module 14 is connected to the terminals for the bus signals CAN_H, CAN_L on the bus 40. An output of the bus voltage detection module 14 is connected to a first input of the bus voltage holding module 15. The first electrical line L1 is connected at its other end, which is not connected to the connection of the resistors 131, 132, to an input of the bus voltage holding module 15. The bus voltage detection module 14 has a control block 141, which is designed to switch a switch 142, and at least one storage element 143. The control block 141 is designed to control the switching position of the switch 142. The control block 141 may also be referred to as a detection module control block. In the example of FIG. 5, the storage element 143 is designed as at least one capacitor 143.

The storage element 143 is used to store the current bus potential. If the storage element 143 is charged, the control block 141 controls the switch 142, so that the switch 142 is opened. The bus potential is thus constantly present at the first input of the bus voltage holding module 15. As a result, the bus voltage holding module 15 remains in the state given by the difference between the threshold voltage U1, which is 2.1 V here, and the bus potential on the bus 40.

The bus voltage holding module 15 is designed as an operational amplifier.

The output of the bus voltage holding module 15 is connected to an input of the bus voltage setting module 16. In addition, the lines L2, L3 are each connected to an input of the bus voltage setting module 16.

The bus voltage setting module 16 has a control block 161, which is designed to switch a switch 162. The control block 161 is designed to control the switching position of the switch 162.

The control block 161 may also be referred to as a setting module control block. The switch 162 is a changeover switch in the example of FIG. 5.

An output of the bus voltage setting module 16, which is connected to one end of the switch 162, is connected to a first input of the bus voltage driver 17. The output of the bus voltage driver 17 is connected to a second input of the bus voltage driver 17. The output of the bus voltage driver 17 is thus fed back to the input of the driver 17.

The bus bias voltage module 18 is connected between the bus voltage driver 17 and the terminals for the bus signals CAN_H, CAN_L on the bus 40. The bus bias voltage module 18 is thus also electrically connected to the terminals for the bus signals CAN_H, CAN_L. The bus bias voltage module 18 has a control block 181, which is designed to control the switching position of a switch 182. The control block 181 switches the switch 182. The control block 181 may also be referred to as a bus bias voltage module control block.

Depending on the control of the control block 161, the switch 162 switches either the voltage U2=1.9 V from the line L2 or the voltage U3=2.5 V from the line L3 as a reference to the bus voltage driver 17. The bus voltage driver 17 accordingly drives the bus bias voltage for the signals CAN_L and CAN_H onto the bus 40 via the terminals for the bus wires 41, 42 when the switch 182 is closed.

For the operation of the subscriber station 10 in the bus system 1, the modules 13 to 18 are designed as follows in order to set a recessive bus potential with mixed operation or to set a recessive bus potential without mixed operation.

The recessive bus potential may also be referred to as a bus bias voltage for the bus 40. This bus bias voltage forms the bus midpoint voltage Vcm, which is equal to the recessive bus potential.

The subscriber station 10 goes through the following chronological sequence(s) to set a recessive bus potential with mixed operation.

After starting, the subscriber station 10 goes to a voltage U3=2.5 V if the subscriber station 10 cannot yet rule out that there is a subscriber station on the bus 40 that uses a voltage of 5 V as a bus voltage supply.

The subscriber station 10, like the subscriber station 30, is designed to “release” the bus midpoint voltage Vcm=U3=2.5 V at a predetermined point in time and to only detect or measure, by means of the detection module 14, the voltage to which the bus 40 adjusts.

The release and detection take place for a predetermined time period T_M1 (FIG. 2), in particular a predetermined number of bits. Such a predetermined point in time t1 is, for example, during the EOF (end of frame), which has 7 recessive bits, as shown in FIG. 2 and mentioned above. In particular, the point in time is after a predetermined bit of the 7 recessive bits.

All subscriber stations that use a bus voltage supply of 3 V, i.e., the subscriber stations 10, 30 here, thus release the bus midpoint voltage Vcm=U3=2.5 V for a predetermined time period T_M1 (FIG. 2), in particular at the end of a frame 450 in EOF (FIG. 2). For this purpose, the control block 181 controls the switch 182 of the bus bias voltage module 18 in such a way that the switch 182 interrupts the connection to the bus 40 for the predetermined time period T_M1 (FIG. 2). The subscriber station switches off the bus bias voltage for the bus 40.

First Case: Heterogeneous Bus System 1

According to a first case, which corresponds to the present exemplary embodiment, there is a heterogeneous bus system 1, in which at least one subscriber station, for example the subscriber station 20, uses a voltage supply 130 of 5 V and accordingly expects and feeds in a bus midpoint voltage Vcm=U3=about 2.5 V.

However, after its start, the subscriber station 10 does not yet know whether a heterogeneous bus system 1 is present or whether a homogeneous bus system 1 is present, in which all subscriber stations 10, 20, 30 on the bus 40 use the same bus voltage supply as the subscriber station 10, in particular 3.3 V, so that the bus midpoint voltage Vcm=U2=about 1.9 V is fed to the bus 40 as the bus bias voltage.

Transmission Operation of the Subscriber Station 10

In the next arbitration phase 451 on the bus 40, the subscriber station 10 starts with a bus voltage of 2.5 V for the recessive state 402, which is specified according to a value of the transmit signal T×D=H (high). That is to say, the control block 161 has switched the switch 162 into the connection to the line L3. Consequently, the bus midpoint voltage Vcm=U3=about 2.5 V is fed to the bus 40 as the bus bias voltage.

If the subscriber station 10 wins the arbitration, the subscriber station 10 may also transmit onto bus 40 in the subsequent data phase 452. For this purpose, after the arbitration phase 451 and before the data phase 452, at the next recessive state 402, the subscriber station 10 pulls the bus level for the recessive state 402 to its desired voltage, namely, U2=1.9 V, and transmits. The bus midpoint voltage Vcm=U2=about 1.9 V is thus set and is fed to the bus 40 as the bus bias voltage.

After completion of the data phase 452, the end 459 of the frame 450 follows, including the EOF, as shown in FIG. 2. The transition from U3 to U2 thus takes place “smoothly.” As a result, the voltage gradually changes to the new value since the inherent impedance of the bus 40 with the connected subscriber stations 10, 20, 30 and the lines between the subscriber stations 10, 20, 30 has a damping effect on the voltage change.

The subscriber station 10, in particular its transmitting/receiving device 12 and/or at least one of its control blocks 141, 161, 181, reliably recognizes the EOF by evaluating the signal RxD (FIG. 6), since RxD=H (high) for more than 5 bits. EOF is 7 bits long. For this purpose, the transmitting/receiving device 12 and/or at least one of its control blocks 141, 161, 181 can have the event detection module 125, in particular a counter, for evaluating the receive signal RxD.

At a certain, in particular late, point in time, for example at bit 6, in the EOF, the subscriber station 10 ascertains whether a Vcm>1.9 V is present on the bus 40. Specifically, the threshold is Vcm=1.9 V+10%.

If, for example, the subscriber station 20 uses a bus voltage supply of 5 V and accordingly feeds in a bus midpoint voltage Vcm=U3=2.5V, the measurement by the detection module 14 shows that the storage element 142 has been charged to a voltage of, for example, 2.5 V. As a result, the bus midpoint voltage Vcm=U3=2.5 V is then present at the first input of the bus voltage holding module 15.

Consequently, the subscriber station 10 evaluates that there are 5V subscriber stations on the bus 40. The control block 161 thus controls the switch 162 so that the potential U3=2.5 V of the line L3 is switched to the input of the module 17. As a result, the bus midpoint voltage Vcm=U3=about 2.5 V can be fed to the bus 40 as a bus bias voltage via the switch 182.

The bus bias voltage on the bus 40 or the potential U3=2.5 V can in particular be set during bit 7 or one of the following 4 recessive bits.

Subscriber Station 10 is not Transmitting, Reception Operation

If the subscriber station 10 is not transmitting, the subscriber station 10 either loses the arbitration or has no data or message 45 to transmit. The subscriber station 10 thus only receives the signals CAN_H, CAN_L from the bus 40 and generates the RxD signal therefrom.

The subscriber station 10, in particular its transmitting/receiving device 12 and/or at least one of its control blocks 141, 161, 181, reliably recognizes the EOF by evaluating the signal RxD, since RxD=H (high) for more than 5 bits. EOF is 7 bits long. For this purpose, the transmitting/receiving device 12 and/or at least one of its control blocks 141, 161, 181 can have the event detection module 125, in particular a counter, for evaluating the receive signal RxD.

At a predetermined, in particular late, point in time, for example at bit 6, in the EOF, the subscriber station 10 ascertains whether a Vcm>1.9 V is present on the bus 40. Specifically, the threshold is Vcm=1.9 V+10%.

If, for example, the subscriber station 20 uses a bus voltage supply of 5 V and accordingly feeds in a bus midpoint voltage Vcm=U3=2.5 V, the measurement of the detection module 14 shows that the storage element 142 has been charged to a voltage of, for example, 2.5 V. As a result, the bus midpoint voltage Vcm=U3=2.5 V is then present at the first input of the bus voltage holding module 15.

The subscriber station 10 thus evaluates that there are 5V subscriber stations on the bus 40. As a result, the control block 161 controls the switch 162 so that the potential U3=2.5 V of the line L3 is switched to the input of the module 17. The potential U3=2.5 V can in particular be set during bit 7 of the EOF (FIG. 1) or one of the following 4 recessive bits. This specifies a bus voltage of 2.5 V for the recessive state 402, which is specified according to a value of the transmit signal TxD=H (high). That is to say, the control block 161 has switched the switch 162 into the connection to the line L3.

Second Case: Homogeneous Bus System 1

According to a second case, there is a homogeneous bus system 1, in which all subscriber stations, including the subscriber station 20, use a bus voltage supply 130 of 3.3 V.

However, after its start, the subscriber station 10 does not yet know whether a heterogeneous bus system 1 is present or whether a homogeneous bus system 1 is present, in which all subscriber stations on the bus 40 use the same bus voltage supply as the subscriber station 10, in particular 3.3 V, so that a bus midpoint voltage Vcm=U2=about 1.9 V is fed to the bus 40.

One of the subscriber stations 10, 20, 30 transmits a frame 450 on the bus 40. In the next arbitration phase 451 on the bus 40, the transmitting subscriber stations 10, 20, 30 start with a bus voltage of 2.5 V for the recessive state 402, which is specified according to a value of the transmit signal TxD=H (high). That is to say, the control block 161 has switched the switch 162 into the connection to the line L3. The subscriber station(s) that do/does not wish to transmit data expect(s) that one of the other subscriber stations also uses a bus voltage supply of 5 V.

In the next step, each of the subscriber stations 10, 20, 30 proceeds according to one of the above-described sequences for transmission operation or reception operation in order to determine whether any of the other subscriber stations uses a bus voltage supply of 5 V.

In a homogeneous bus system 1, the detection with the bus voltage detection device 14 shows that none of the other subscriber stations uses a bus voltage supply of 5 V.

The subscriber stations 10, 20, 30 of the bus system 1 therefore permanently switch the switch 162 in such a way that the potential of the line L2 is switched to the input of the module 17. "Permanently" means that, after the described setting of the module 16, no detections will be carried out by means of the detection module 14. Alternatively, however, "permanently" may mean that, after the described setting of the module 16, a measurement is carried out by means of the module 14 from time to time, in particular every N-th frame 450. N is a natural number greater than 1. The time intervals between the measurements do not have to be the same.

The subscriber station 10 is thus designed to perform a detection or measurement during at least one recessive bus state in order to ascertain whether a bus midpoint voltage Vcm>1.9 V is present on the bus 40. Specifically, the threshold is 1.9 V+10%.

Optionally, from at least one dominant level 402 of the winner of the arbitration, at least one of the subscriber stations 10, 30 could additionally recognize during the arbitration phase 451 whether the winner of the arbitration uses a bus voltage supply of 5 V or 3 V. In the arbitration phase 451, the subscriber stations 10, 30 would thus additionally carry out a detection by means of the detection module 14 from a point in time t2 (FIG. 2) for a time period T_M2 (FIG. 2) in order to ascertain whether a bus midpoint voltage Vcm>1.9 V is present on the bus 40. Specifically, the threshold is 1.9 V+10%. The time periods T_M1, T_M2 may be the same or different.

Optionally, at least one of the subscriber stations 10, 30 could additionally carry out a detection by means of the detection module 14 during the SIC phase, which is equal to the arbitration phase 451. For this purpose, the value of Vcm_sic is ascertained within the time period t_sic<=355 ns (FIG. 9). The time period t_sic corresponds to the minimum time in which the state 403 (sic) is active, starting from the transition from the state 401 (dom) to the state 402 (rec) at the end of the arbitration. The time period T_M1 may differ from the time of t_sic.

The aforementioned methods are also applicable if at least one of the subscriber stations 10, 30 functions as a CAN-XL node, i.e., transmits a CAN-XL message 45.

According to the above-described embodiments, the described transmitting/receiving device 12 of the subscriber station 10 is designed, in a controlled manner, to become lower-impedance than the other transmitting/receiving devices 20, 30 on the bus 40. "Becoming lower-impedance" takes place within the time that the subscriber station 10, 30 or the subscriber station 20 is allowed to take according to the CAN specification before it must start transmitting after the arbitration phase 451. As soon as "becoming lower-impedance" has taken place, the subscriber station 10, in particular its transmitting/receiving device 12, can transmit its message 45 or 47 within the limits of the EMC specification. Following the transmission process, the subscriber station 10 must have the same high impedance as the other subscriber stations 20, 30 on the bus 40, so that the bus voltage is again established somewhere in the middle. For this process, the subscriber station 10 again has a little time, which is defined in the CAN specification.

Figure 11:
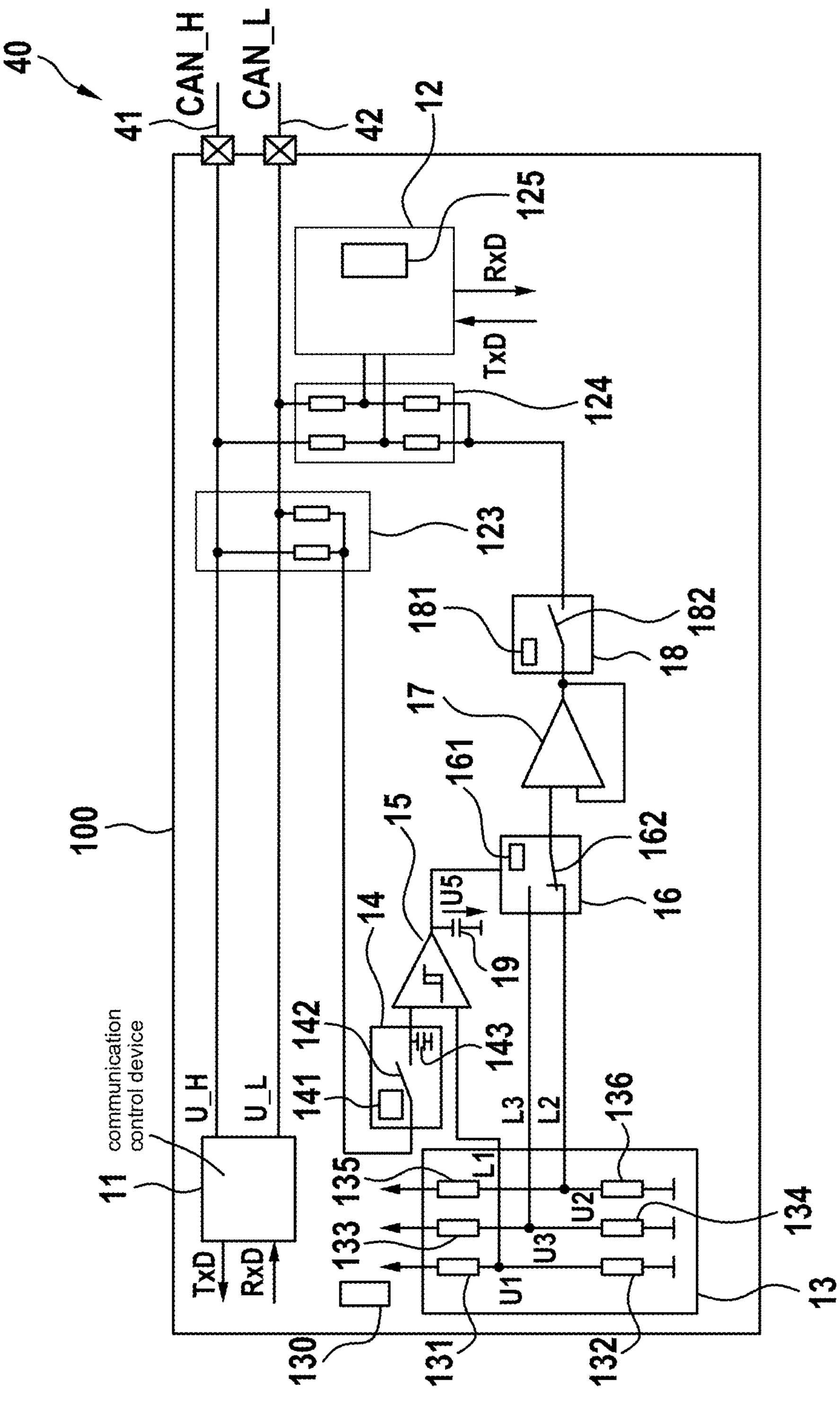
FIG. 11 shows a circuit diagram of a subscriber station of the bus system according to a second exemplary embodiment of the present invention.

FIG. 11 shows a subscriber station 100 according to a second exemplary embodiment.

In many parts, the subscriber station 100 is designed in the same way as the subscriber station 10 of the above-described exemplary embodiment. Therefore, only the differences from the subscriber station 10 of the above-described exemplary embodiment are described below.

In contrast to the subscriber station 10 of the above-described exemplary embodiment, the subscriber station 100 of FIG. 11 has at least one storage element 19. In the example of FIG. 11, the storage element 19 is designed as at least one capacitor. The storage element 19 serves to store the voltage U5 at the output of the holding module 15. The voltage U5 corresponds to the bus potential of the bus 40 that is output by the holding module 15.

This makes it even easier to ensure that the bus potential detected by the module 14 is present at the corresponding input of the module 16.

As a result, the function of at least the module 15 and thus the result of the module 16 is further improved in comparison with the subscriber station 10 of the above-described exemplary embodiment. As a result, the function of the subscriber station 100 is also further improved in comparison with the subscriber station 10 of the above-described exemplary embodiment.

Figure 12:
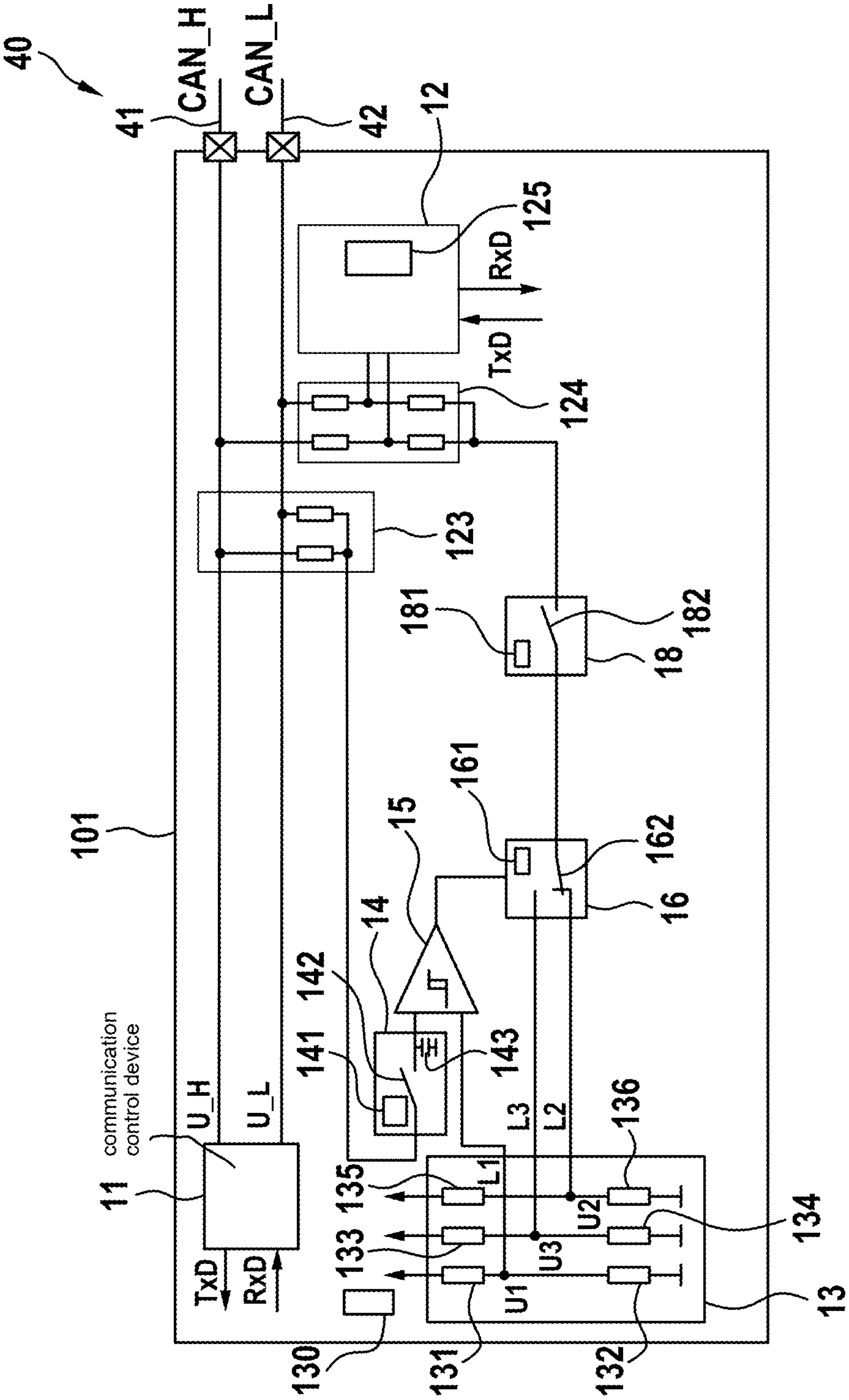
FIG. 12 shows a circuit diagram of a subscriber station of the bus system according to a third exemplary embodiment of the present invention.

FIG. 12 shows a subscriber station 101 according to a third exemplary embodiment.

In many parts, the subscriber station 101 is designed in the same way as the subscriber station 10 of the above-described exemplary embodiment. Therefore, only the differences from the subscriber station 10 of the above-described exemplary embodiment are described below.

In contrast to the subscriber station 10 of the above-described exemplary embodiment, the subscriber station 101 of FIG. 12 has no module 17. The reference voltage sources of the module 13 are therefore used directly to drive the bus wires 41, 42.

This further simplifies the circuitry of the subscriber station 10.

According to a fourth exemplary embodiment, the module 13 is designed as a semiconductor that has three bandgap derivatives.

That is to say, as shown in FIG. 10 to FIG. 12, the module 13 has a first bandgap derivative 131, 132, which provides the voltage U1 for the line L1 of the subscriber stations 10, 100, 101. In addition, the module 13 has a second bandgap derivative 133, 134, which provides the voltage U3 for the line L3 of the subscriber stations 10, 100, 101. In addition, the module 13 has a third bandgap derivative 135, 136, which provides the voltage U2 for the line L2 of the subscriber stations 10, 100, 101. As a result, instead of the resistors 131 to 136 in FIG. 10 to FIG. 12, the bandgap derivatives of the semiconductor provide the above-described reference voltages U1, U2, U3.

Otherwise, the function is the same as described for the above-described exemplary embodiments.

All of the above-described embodiments of the transmitting/receiving devices 12, 22, the subscriber stations 10, 20, 30, the bus system 1 and the method carried out therein according to the exemplary embodiment and their modifications can be used individually or in all possible combinations. Additionally, the following modifications are possible in particular.

The above-described bus system 1 is described on the basis of a bus system based on the CAN protocol. However, the bus system 1 according to the exemplary embodiment may alternatively be another type of communication network in which the signals are transmitted as differential signals.

It is advantageous, but not necessarily a prerequisite, for exclusive, collision-free access of a subscriber station 10, 20, 30 to the bus 40 to be ensured in the bus system 1, at least for certain time periods.

The bus system 1 according to the exemplary embodiment and its modifications is in particular a bus system in which communication can take place between at least two of the subscriber stations 10, 20, 30 according to two different CAN standards, such as CAN-HS or CAN FD or CAN SiC or CAN XL. The functionality of the above-described exemplary embodiment can thus be used, for example, in transmitting/receiving devices 12, 22 that are to be operated in such a bus system.

The number and arrangement of the subscriber stations 10, 20, 30 in the bus system 1 according to the exemplary embodiment and their modifications can be selected as desired.

In particular, it is possible that the subscriber station 10 has a bus voltage supply of 5 V and the subscriber station has a bus voltage supply of 3.3 V.

In addition, the bus voltage supply of one of the subscriber stations 10, 20, 30 is not limited to 3.3 V. The bus voltage supply can have a value other than 3.3 V. The above-described principle of the bus system 1 with subscriber stations 10, 20, 30 in mixed operation can also be applied here. If necessary, the mentioned voltages of the module 13 must be adjusted appropriately for this purpose.

What is claimed is:

1. A subscriber station of a serial bus system, comprising:

a transmitting/receiving device configured to transmit a digital transmit signal as an analog differential signal onto a bus of the bus system in order to transmit a message to at least one other subscriber station of the bus system, and/or configured to receive an analog signal from the bus;

a switching module configured to switch off a bus bias voltage for the bus during a predetermined detection period;

a bus voltage detection module configured to detect a bus voltage received by the transmitting/receiving device from the bus during the predetermined detection period; and a bus voltage setting module configured to set the bus bias voltage to a voltage value resulting from a detection carried out by the bus voltage detection module during the predetermined detection period.

2. The subscriber station according to claim 1, further comprising:

a detection module control block configured to control the bus voltage detection module in such a way that a recessive state, which is overridable by a dominant state on the bus, prevails on the bus during the predetermined detection period.

3. The subscriber station according to claim 1, further comprising:

a detection module control block configured to control the bus voltage detection module in such a way that a transition from a dominant state to a recessive state, which is overridable by a dominant state on the bus, takes place on the bus during the predetermined detection period, wherein the transition from the dominant state to a recessive state is a SIC state.

4. The subscriber station according to claim 1, further comprising:

a detection module control block configured to control the bus voltage detection module in such a way that, during the predetermined detection period, an end of an arbitration phase takes place and a dominant state prevails on the bus.

5. The subscriber station according to claim 2, wherein the bus voltage detection module further includes a switch and a storage element, and wherein the detection module control block is configured to control the switch for connecting the storage element to the bus in order to detect the bus voltage received by the transmitting/receiving device from the bus.

6. The subscriber station according to claim 1, further comprising:

a bus voltage provision module configured to provide two different bus bias voltages;

wherein the bus voltage setting module is configured to set one of the two different bus bias voltages for the transmitting/receiving device based on the bus voltage detected by the bus voltage detection module during the predetermined detection period.

7. The subscriber station according to claim 6, wherein the bus voltage provision module including a voltage divider with six resistors for providing the two different bus bias voltages.

8. The subscriber station according to claim 6, wherein the bus voltage provision module includes a semiconductor with three bandgap derivatives for providing the two different bus bias voltages.

9. The subscriber station according to claim 1, wherein the bus voltage setting module includes a changeover switch and a setting module control block for controlling a position of the changeover switch based on the bus voltage detected by the bus voltage detection module during the predetermined detection period.

10. The subscriber station according to claim 1, wherein the subscriber station is configured to negotiate with other subscriber stations of the bus system during a first communication phase as to which subscriber station will have exclusive access to the bus in a following second communication phase and will thus be allowed to transmit a message.

11. The subscriber station according to claim 1, wherein the transmitting/receiving device is configured to generate the analog differential signal in a first communication phase of the message with a different physical layer than in a second communication phase.

12. The subscriber station according to claim 2, further comprising:

an event detection module configured to detect an event, after which the bus voltage detection module has to carry out the detection of the bus voltage present on the bus;

wherein the detection module control block is configured to control the bus voltage detection module for the detecting of the bus voltage present on the bus during the predetermined detection period after the event detection module has detected the event.

13. The subscriber station according to claim 12, wherein the event is a predetermined number of directly consecutive recessive bits at an end (EOF) of a frame transmitted for a message via the bus.

14. The subscriber station according to claim 12, wherein:

the subscriber station is configured to negotiate with other subscriber stations of the bus system during a first communication phase as to which subscriber station will have exclusive access to the bus in a following second communication phase and will thus be allowed to transmit its message, and the event is that, at an end of the first communication phase, the subscriber station that will have exclusive access to the bus in the following second communication phase and will thus be allowed to transmit a message is ascertained.

15. The subscriber station according to claim 1, further comprising:

a bus voltage holding module configured to hold the bus voltage detected on the bus by the bus voltage detection module; and a storage element, arranged between the bus voltage holding module and the bus voltage setting module, configured to store a voltage at an output of the bus voltage detection module.

16. The subscriber station according to claim 1, further comprising:

a bus voltage driver configured to drive the bus bias voltage set by the bus voltage setting module for the transmitting/receiving device onto the bus.

17. The subscriber station according to claim 1, further comprising:

a communication control device configured to control communication in the bus system and to generate the transmit signal;

wherein the subscriber station is configured for communication in a bus system in which exclusive, collision-free access of a subscriber station to the bus of the bus system is guaranteed at least temporarily.

18. A bus system, comprising:

a bus; and at least two subscriber stations which are connected to one another via the bus in such a way that the at least two subscriber stations can communicate serially with one another and of which at least one subscriber station is a subscriber station including:

a transmitting/receiving device configured to transmit a digital transmit signal as an analog differential signal onto a bus of the bus system in order to transmit a message to at least one other subscriber station of the bus system, and/or configured to receive an analog signal from the bus;

a switching module configured to switch off a bus bias voltage for the bus during a predetermined detection period;

a bus voltage detection module configured to detect a bus voltage received by the transmitting/receiving device from the bus during the predetermined detection period; and a bus voltage setting module configured to set the bus bias voltage to a voltage value resulting from a detection carried out by the bus voltage detection module during the predetermined detection period.

19. A method for communication with differential signals in a serial bus system, in which a subscriber station of the bus system has a transmitting/receiving device configured to transmit a digital transmit signal as an analog differential signal onto a bus of the bus system in order to transmit a message to at least one other subscriber station of the bus system, and/or configured to receive an analog signal from the bus, the method comprising the following steps:

switching off, using a switching module, a bus bias voltage for the bus during a predetermined detection period;

detecting, using a bus voltage detection module, a bus voltage received by the transmitting/receiving device from the bus during the predetermined detection period; and setting, using a bus voltage setting module, the bus bias voltage to a voltage value resulting from a detection carried out by the bus voltage detection module during the predetermined detection period.

* * * * *